United States Patent Office 3,578,680
Patented May 11, 1971

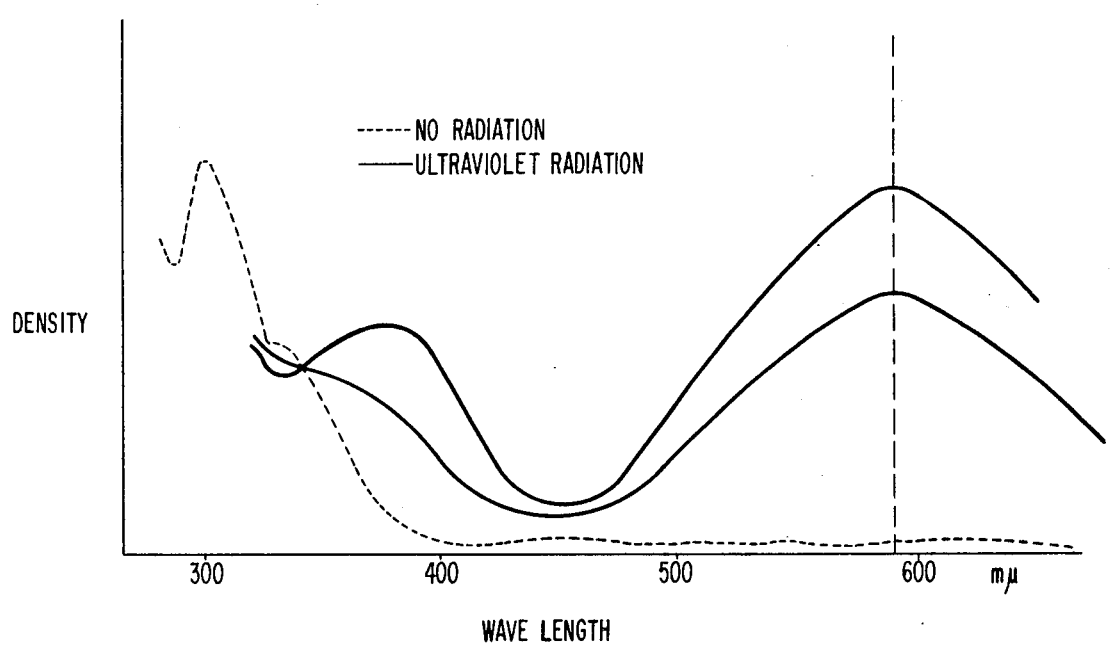

3,578,680
PHOTOCHROMIC COMPOUND
Hisatake Ono and Chiaki Osada, Saitama, Japan, assignors to Fuji Photo Film Co., Ltd., Kanagawa, Japan
Filed June 10, 1968, Ser. No. 735,896
Claims priority, application Japan, June 9, 1967, 42/36,877
Int. Cl. C07d 27/38
U.S. Cl. 260—326.11                         7 Claims

ABSTRACT OF THE DISCLOSURE

A photochromic compound which exhibits the ability to change color under the influence of exciting radiation represented by the general formula

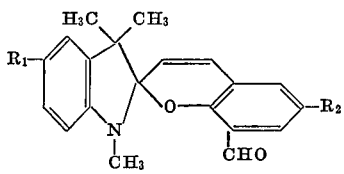

$R_1$ can be hydrogen, a halogen, a cyan group, an alkoxy group having from 1 to 8 carbon atoms and an alkyl group having from 1 to 8 carbon atoms. $R_2$ may be either hydrogen or a halogen.

Several specific compounds are also described in the disclosure.

BACKGROUND OF THE INVENTION

Field of the invention

This invention relates to a novel photochromic compound and, more particularly, is concerned with a photochromic compound capable of repeated color formation or color discharging under the action of light.

Description of the prior art

Ordinarily, a "photochromic system" is used to describe the situation where a molecule or complex undergoes a reversible color change under the action of light. Although a material having such a property is stable when there is no radiation, and has an intrinsic absorption spectrum, the absorption spectrum of the material changes as soon as it is subjected to light. The color change is visible to the naked eye. When light is removed, the material returns to its original condition.

Many photochromic materials are known to the prior art. Inorganic photochromic materials have excellent light resistance, and exhibit excellent reproducibility of color changes. Generally, however, with inorganic photochromic materials the degree of color change is not large, the speed of the reverse color reaction is slow and organic solvent solubility is low. Organic photochromic materials generally exhibit exacty opposite characteristics. Although the organic types have a large degree of color change, a high speed back reaction and good organic solvent solubility, but the light resistance and reproducibility of color change are not high. For example, 1,3,3 - trimethyl - 6'-nitrospiro(indoline - 2,2' - 2'H - chromene) has a sufficient color change, but its light resistance, speed of back reaction in a high viscosity liquid and repeated strength are not adequate.

The compound of the present invention provides a photochromic composition which illustrates a high degree of color change upon exposure to radiation, a high speed of reversibility, good solubility in organic solvents, high light resistance and will exhibit excellent color-change reproducibility.

SUMMARY OF THE INVENTION

A photochromic compound represented by the following general formula:

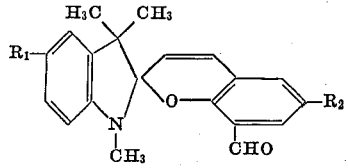

wherein $R_1$ may be a hydrogen atom, a halogen atom, a cyan group, an alkoxy group or an alkyl group having from 1 to 8 carbon atoms, and $R_2$ is a hydrogen atom or a halogen atom.

The typical photochromic color change is exhibited upon exposure to ultraviolet radiation, and reversibility to the original unradiated state generally occurs upon removal of the exciting ultraviolet radiation and, preferably, in darkness.

Specific preferred embodiments of the compound described above are:

8' - formyl - 1,3,3 - trimethylspiro(indoline - 2,2'-2'H-chromene),
8' - formyl - 1,3,3,5 - tetramethylspiro(indoline - 2,2' - 2'H-chromene),
8' - formyl - 5 - methoxy - 1,3,3 - trimethylspiro(indoline-2,2'-2'H-chromene).

It is the principal object of the invention to provide a photochromic composition having a color change of a high degree, a high speed back reaction, good organic solvent solubility, high light resistance and excellent color-change reproducibility.

BRIEF DESCRIPTION OF THE DRAWING

The drawing illustrates the spectrum change of a representative compound of this invention in the absence of radiation (broken line) and under exposure to ultraviolet radiation (solid line).

DESCRIPTION OF THE PREFERRED EMBODIMENTS

The main feature of the present invention consists in a photochromic compound represented by the following general formula,

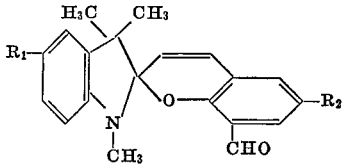

in which $R_1$ is hydrogen atom, halogen atom, cyan group, alkoxy group or alkyl group of $C_1-C_8$ and $R_2$ is hydrogen atom or halogen atom.

The compound represented by the general formula is obtained, for example, by refluxing 5-$R_1$-1,3,3-trimethyl-2-methyleneindoline and 4-$R_2$-2,6-diformylphenol in equimolecular amounts in a solvent, such as ethyl alcohol, distilling off the solvent after the reaction, and concentrating the products. The compound obtained is dissolved in a suitable organic solvent, such as toluene, benzol or ether, if necessary, with a high molecular weight compound, such as polystyrene, polyvinyl chloride, polyvinyl acetate, ethyl cellulose, polymethyl methacrylate or cellulose acetate, and applied to a transparent support or baryta paper, followed by drying.

The resulting photochromic material is stable to sunlight admitted through a window glass and is colorless. However, upon exposure to ultra violet radiation a blue to red violet color will be exhibited. The material will return to the colorless state in several minutes after removal of the ultraviolet source.

When a chloroform solution of one of these compounds with ethyl cellulose is applied to baryta paper and dried, its photochromic function will not be lost even if it is exposed directly to summer sunlight. Known compounds for example, the 1,3,3-trimethyl-6'-nitrospiro(indoline-2, 2',2'H-chromene) may lose their color-change function in about 30 minutes if they are exposed under the same conditions.

An example of the spectrum change of the compound of this invention due to ultraviolet radiation is shown in the accompanying drawing. A benzene solution of the compound of this invention wherein $R_1$ is H, and $R_2$ is H may be prepared in any suitable concentration, and a mercury lamp (Toshiba SHL–100) was the light source. The broken line represents a spectrum when no radiation is applied while the solid line (1) represents the spectrum in the case of exposure to radiation for one (1) minute, and the solid line (2) represents the spectrum in the case of exposure to radiation for two (2) minutes.

Examples of photochromic materials using the composition of the present invention are photographic photochromic materials, in which the composition is coated onto a high molecular base or baryta paper; photochromic materials for use in furniture and structural materials, such as curtains and glass; photochromic materials for use in filters; and photochromic materials for decorative use, such as in lens and glass materials.

The invention will now be further illustrated by the following examples.

EXAMPLE 1

17.3 g. of 1,3,3-trimethyl-2-methyleneindoline and 16.5 g. of 2,6-diformylphenol, melting at 88° C., synthesized by the method of H. Voswinkel, Ber. 15, 2023 (1882), were dissolved in 250 ml. of ethyl alcohol and refluxed for 2 hours. The reaction solution thickened and turned red-violet in color. After distilling off the ethyl alcohol, the reaction solution was concentrated to about ⅓ its former mass, and allowed to stand overnight to give a crystal. After filtering, the crystal was washed with ethyl alcohol, dried and recrystallized in ethyl alcohol, thus obtaining 10.2 g. of a light yellow crystal of 8'-formyl-1,3,3-trimethylspiro(indoline-2,2'-2'H-chromene), melting at 129–130° C. and giving a blue color when melted at this temperature.

Solutions of this material in benzol, toluene and ether were coated onto a white paper and transparent film respectively, and were dried. The resulting photochromic materials turned blue, under ultraviolet radiation, and returned to their original colorless state when allowed to stand in the dark.

EXAMPLE 2

3.7 g. of 1,3,3,5-tetramethyl-2-methyleneindoline and 3 g. of 2,6-diformylphenol were dissolved in 50 ml. of ethyl alcohol and refluxed for 2 hours. The reaction solution directly thickened and turned red-violet in color. After distilling off the ethyl alcohol, a small amount of acetone was added thereto, and the wall was rubbed to begin deposition of a light pink crystal. After filtering, the crystal was washed with a small amount of cold ethyl alcohol, thus obtaining a light yellow crystal of 8'formyl-1,3,3,5-tetramethylspiro(indoline-2,2'-2'H-chromene). After recrystallization from ethyl alcohol, the melting point of the crystal was 140–142° C. The properties of this compound were similar to those of Example 1.

EXAMPLE 3

2.8 g. of 5-chloro-1,3,3-trimethyl-2-methyleneindoline and 2.1 g. of 2,6-diformylphenol were refluxed in 30 ml. of ethyl alcohol and the excess ethyl alcohol was distilled off. To the resultant viscous red-violet residue there was added about 5 ml. of a mixture of ether and petroleum ether (1:1). This mixture was allowed to stand in order to deposit a crystal. About 5 ml. of acetone was added to the mixture and it was filtered, thus obtaining a light pink crystal of 5-chloro-8'-formyl-1,3,3-trimethylspiro(indoline-2,2'-2'H-chromene). After recrystallization from ethyl alcohol, the melting point was 130–132° C. The properties thereof were similar to those of Example 1.

EXAMPLE 4

3.6 g. of 5-methoxy-1,3,3-trimethyl-2-methyleneindoline and 2.8 g. of 2,6-diformylphenol were processed in a manner similar to that of Example 3.

After recrystallization from ethyl alcohol, a light yellow crystal of 8'-formyl-5-methoxy-1,3,3-trimethylspiro-(indoline-2,2'-2'H-chromene) melting at 146–148° C. was obtained. The properties thereof were similar to that of Example 1.

EXAMPLE 5

9 g. of 2,6-diformylphenol was dissolved in 90 ml. of acetic acid, to which 9.5 g. of bromine was dropwise added at room temperature for about 1 hour. After stirring for a further 1.5 hours, the reaction product was added to 200 ml. of cold water. The resulting solid was filtered, washed and recrystallized from a water-ethyl alcohol solution (10:1). The wet crystal was then dried at 80° C. under reduced pressure to obtain 11.0 g. of a white needle-like crystal of 4-bromo-2,6-diformylphenol, melting at 113–115° C. 4.6 g. of this 4-bromo-2,6-diformylphenol and 3.5 g. of 1,3,3,5-tetramethyl-2-methyleneindoline were dissolved in 50 ml. of ethyl alcohol and refluxed for 2 hours. The reaction solution thickened and turned red-violet in color. When the ethyl alcohol was distilled off after reaction, a thickened green crystal of 6'-bromo-8'-formyl-1,3,3,5-tetramethylspiro(indoline - 2,2'-2'H-chromene) was obtained, and was recrystallized from ethyl alcohol with a resultant melting point of 178–181° C.

Small amounts of this material were dissolved in benzene, toluene and xylene, respectively, to give colorless solutions. These solutions turned blue under ultraviolet radiation, and directly returned to their original colorless state when allowed to stand in the dark.

EXAMPLE 6

2 g. of 5-cyano-1,3,3-trimethyl-2-methyleneindoline and 2.3 g. of 4-bromo-2,6-diformylphenol were dissolved in 25 ml. of ethyl alcohol and refluxed for 2 hours. When the ethyl alcohol was distilled off after the reaction, a thickened red-violet viscous material of 6'-bromo-5-cyano-8'-formyl-1,3,3-trimethylspiro(indoline - 2,2' - 2'H - chromene) was obtained. The mass hardly crystallized at all, and had the same characteristics as the material of Example 5.

While the invention has been particularly shown and described with reference to preferred embodiments thereof, it will be understood by those skilled in the art that various changes in form and details may be made therein without departing from the spirit and scope of the invention.

What is claimed is:
1. A compound of the formula

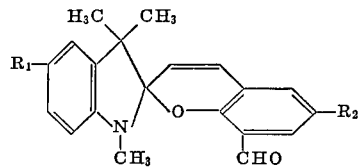

wherein $R_1$ is a member selected from the group consisting of a hydrogen atom, a halogen atom, a cyan group, an alkoxy group having from 1 to 8 carbon atoms, and an alkyl group having from 1 to 8 carbon atoms, and $R_2$ is a member selected from the group consisting of a hydrogen atom and a halogen atom.

2. A compound as claimed in claim 1, which is 8'-formyl-1,3,3-trimethylspiro(indoline-2,2'-2'H-chromene).

3. A compound as claimed in claim 1, which is 8'-formyl - 1,3,3,5 - tetramethylspiro(indoline - 2,2' - 2'H-chromene).

4. A compound as claimed in claim 1, which is 8'-formyl - 5 - methoxy - 1,3,3 - trimethylspiro(indoline-2,2'-2'H-chromene).

5. A compound as in claim 1, which is 5-chloro-8'-formyl-1,3,3-trimethylspiro(indoline-2,2'-2'H-chromene).

6. A compound as in claim 1, which is 6'-bromo-8'-formyl - 1,3,3,5 - tetramethylspiro(indoline - 2,2' - 2'H-chromene).

7. A compound as in claim 1, which is 6'-bromo-5-cyano - 8' - formyl - 1,3,3 - trimethylspiro(indoline - 2,2'-2'H-chromene).

References Cited
UNITED STATES PATENTS

| | | | |
|---|---|---|---|
| 3,100,778 | 8/1963 | Berman | 260—326.11 |
| 3,299,079 | 1/1967 | Taylor | 260—294.7 |

ALEX MAZEL, Primary Examiner

J. A. NARCAVAGE, Assistant Examiner

U.S. Cl. X.R.

117—33.3; 252—300; 350—160